(12) United States Patent
Shimizu

(10) Patent No.: US 9,983,381 B2
(45) Date of Patent: May 29, 2018

(54) LENS BARREL AND OPTICAL INSTRUMENT

(71) Applicant: Samsung Electronics Co., Ltd., Suwon-si, Gyeonggi-do (KR)

(72) Inventor: Yoshiaki Shimizu, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 15/204,209

(22) Filed: Jul. 7, 2016

(65) Prior Publication Data

US 2016/0313534 A1    Oct. 27, 2016

Related U.S. Application Data

(63) Continuation of application No. PCT/KR2014/012828, filed on Dec. 24, 2014.

(30) Foreign Application Priority Data

Feb. 28, 2014 (JP) .................................. 2014-039651
Aug. 18, 2014 (JP) .................................. 2014-165842

(51) Int. Cl.
*G02B 7/10* (2006.01)
*G03B 3/02* (2006.01)
(Continued)

(52) U.S. Cl.
CPC ............... *G02B 7/10* (2013.01); *G02B 7/102* (2013.01); *G02B 7/14* (2013.01); *G03B 3/02* (2013.01); *G03B 5/00* (2013.01); *G03B 17/12* (2013.01)

(58) Field of Classification Search
None
See application file for complete search history.

(56) References Cited

U.S. PATENT DOCUMENTS 5,937,215 A * 8/1999 Mogamiya ............... G02B 7/10
                                                          396/72
6,373,641 B2    4/2002 Koiwai
(Continued)

FOREIGN PATENT DOCUMENTS

JP    2002-023036 A    1/2002
JP    2010-066294 A    3/2010
(Continued)

*Primary Examiner* — W B Perkey
(74) *Attorney, Agent, or Firm* — Jefferson IP Law, LLP

(57) ABSTRACT

A lens barrel and an optical device having small sizes by saving a space for inner components such as a moving group while stably retaining and moving the inner components are provided. The lens barrel retains lenses while allowing movement along an optical axis. The lens barrel includes: a first frame; a second frame positioned inside the first frame; and n linear guide structures configured to allow movement of the second frame relative to the first frame along the optical axis, wherein the n linear guide structures include: n linear guide concave parts spaced apart from each other in a circumferential direction around the optical axis and extending along the optical axis; and n linear guide convex parts engaging with the n linear guide concave parts in a relatively movable manner, wherein some of the n linear guide concave parts are provided on the first frame, and the others of the n linear guide concave parts are provided on the second frame (n is an integer equal to or greater than 2).

18 Claims, 10 Drawing Sheets

(51) Int. Cl.
   *G03B 5/00*     (2006.01)
   *G03B 17/12*    (2006.01)
   *G02B 7/14*     (2006.01)

(56) References Cited

U.S. PATENT DOCUMENTS

| | | | |
|---|---|---|---|
| 2004/0212702 A1 | 10/2004 | Suh | |
| 2007/0153403 A1* | 7/2007 | Yamazaki | G02B 7/10 |
| | | | 359/819 |
| 2008/0013190 A1* | 1/2008 | Oshima | G02B 7/102 |
| | | | 359/699 |
| 2009/0067069 A1 | 3/2009 | Matsumoto | |
| 2009/0207505 A1 | 8/2009 | Nomura et al. | |
| 2011/0007409 A1 | 1/2011 | Nagae | |
| 2011/0194194 A1 | 8/2011 | Terahara | |
| 2014/0079384 A1* | 3/2014 | Kang | G02B 7/10 |
| | | | 396/529 |
| 2016/0313534 A1* | 10/2016 | Shimizu | G02B 7/102 |

FOREIGN PATENT DOCUMENTS

| | | |
|---|---|---|
| JP | 2011-007938 A | 1/2011 |
| JP | 2011-095499 A | 5/2011 |

\* cited by examiner

LENS BARREL AND OPTICAL INSTRUMENT

CROSS-REFERENCE TO RELATED APPLICATION(S)

This application is a continuation application, claiming the benefit under § 365(c), of an International application filed on Dec. 24, 2014 and assigned application number PCT/KR2014/012828, which claimed the benefit of a Japanese patent application filed on Feb. 28, 2014 in the Japanese Patent Office and assigned Serial number 2014-39651, and of a Japanese patent application filed on Aug. 18, 2014 in the Japanese Patent Office and assigned Serial number 2014-165842, the entire disclosure of which is hereby incorporated by reference.

TECHNICAL FIELD

The present disclosure relates to a lens barrel and an optical device.

BACKGROUND

A lens barrel including a barrel and a cam barrel is disclosed. In the lens barrel, a groove part is formed in a fixed frame, a linear groove is formed in a rotatable barrel, and a driving pin is formed on the cam barrel. The driving pin engages with the linear groove through the groove part. In the lens barrel disclosed in Patent document 1, the groove part, the linear groove, and the driving pin are arranged at angular positions approximately trisecting a circumference around an optical axis, and a movable group is linearly moved according to the rotation of the rotatable barrel.

The above information is presented as background information only to assist with an understanding of the present disclosure. No determination has been made, and no assertion is made, as to whether any of the above might be applicable as prior art with regard to the present disclosure.

RELATED ART DOCUMENT

[Patent Document 1] Japanese Patent Application Publication No. 2011-7938

SUMMARY

However, in the lens barrel, the groove part formed in the fixed frame and the linear groove formed in the rotatable barrel are arranged across each other. Therefore, the driving pin should have a sufficient degree of strength so as to engage with both the groove part and the linear groove that cross each other, and thus it is necessary to form the driving pin to have a certain size. As a result, it is necessary to increase the width of the groove part or the linear groove for engagement with the driving pin, and thus a corresponding space is necessary in the fixed frame or the rotatable barrel.

In addition, a member (the rotatable barrel), in which the linear groove is formed, should have a sufficient degree of strength to prevent deformation of the linear groove and guarantee linear movement of a moving group. To this end, it is preferable that a sidewall of the rotatable barrel be continuous throughout the circumference of the rotatable barrel. However, if a notch shape is formed in the sidewall of the rotatable barrel by removing a portion of the sidewall in a height direction, it may be difficult to guarantee a sufficient degree of strength for linear movement.

Due to this reason, if a notch shape is not formed in the member, in which the linear groove is formed, because inner components such as a moving group are accommodated inside the member, it may be difficult to reduce the size of the lens barrel.

Aspects of the present disclosure are to address at least the above-mentioned problems and/or disadvantages and to provide at least the advantages described below. Accordingly, an aspect of the present disclosure is to provide a lens barrel and an optical device having small sizes by saving a space for inner components such as a moving group while stably retaining and moving the inner components.

An embodiment of the present disclosure provides a lens barrel retaining lenses while allowing movement along an optical axis, the lens barrel including: a first frame; a second frame positioned inside the first frame; and n linear guide structures configured to allow movement of the second frame relative to the first frame along the optical axis, wherein the n linear guide structures may include: n linear guide concave parts spaced apart from each other in a circumferential direction around the optical axis and extending along the optical axis; and n linear guide convex parts engaging with the n linear guide concave parts in a relatively movable manner, wherein some of the n linear guide concave parts may be provided on the first frame, and the others of the n linear guide concave parts may be provided on the second frame (n is an integer equal to or greater than 2).

Another embodiment of the present disclosure provides a lens barrel retaining lenses while allowing movement along an optical axis, the lens barrel including: a first frame; a second frame positioned inside the first frame; a fixed frame positioned outside the first frame; and n linear guide structures configured to allow movement of the second frame relative to the first frame along the optical axis, wherein the n linear guide structures may include: n linear guide concave parts spaced apart from each other in a circumferential direction around the optical axis and extending along the optical axis; and n linear guide convex parts engaging with the n linear guide concave parts in a relatively movable manner, wherein the n linear guide concave parts may be provided on at least two of the first frame, the second frame, and the fixed frame (n is an integer equal to or greater than 2).

Another embodiment of the present disclosure provides a lens barrel retaining lenses while allowing movement along an optical axis, the lens barrel including: a first frame; a second frame positioned inside the first frame; and n linear guide structures configured to allow movement of the second frame relative to the first frame along the optical axis, wherein n−1 linear guide structures of the n linear guide structures may include: n−1 linear guide concave parts spaced apart from each other in a circumferential direction around the optical axis and extending along the optical axis; and n−1 linear guide convex parts engaging with the n−1 linear guide concave parts in a relatively movable manner, and the other one of the n linear guide structures may include: a shaft spaced apart from the n−1 linear guide concave parts and the n−1 linear guide convex parts in the circumferential direction around the optical axis; and a sleeve engaging with the shaft, wherein the shaft may be positioned at one of the first and second frames, and the sleeve may be positioned at the other of the first and second frames (n is an integer equal to or greater than 3).

An embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis, wherein n linear guide concave parts and n linear guide convex parts are provided on the first and second frames, the n linear guide concave parts extending along the optical axis and being located at angular positions dividing a circumference around the optical axis into n approximately equal parts, the n linear guide convex parts engaging with the n linear guide concave parts in a relatively movable manner, wherein one to n−1 of the n linear guide concave parts are provided on the first frame, the other of the n linear guide concave parts is provided on the second frame, and each of the n linear guide convex parts is provided on one of the first and second frames on which the linear guide concave part engaging with the linear guide convex part is not provided (n is an integer equal to or greater than 2).

In the above, n may be 3.

In the lens barrel, the linear guide concave parts and the linear guide convex parts provided as guides for moving the second frame relative to the first frame along the optical axis are dispersed on the first and second frames. That is, all the linear guide concave parts are not provided on one of the first and second frames. Therefore, the strength of the first and second frames may be higher than a required value, and thus notch portions may be formed in the circumferential walls of the first and second frames.

In addition, another embodiment of the present disclosure provides a lens barrel retaining lenses while allowing movement along an optical axis, the lens barrel including: a first frame including a circumferential wall surrounding the optical axis; a second frame including a circumferential wall surrounding the optical axis, the second frame being inserted into the first frame and movable relative to the first frame along the optical axis; and a fixed barrel into which the first frame is inserted, wherein n linear guide concave parts and n linear guide convex parts are provided on the first frame, the second frame, and the fixed barrel, the n linear guide concave parts extending along the optical axis and being located at angular positions dividing a circumference around the optical axis into n approximately equal parts, the n linear guide convex parts engaging with the n linear guide concave parts in a relatively movable manner, wherein one to n−1 of the n linear guide concave parts are provided on the first frame, the other of the n linear guide concave parts is provided on the second frame, and each of the n linear guide convex parts is provided on the fixed barrel or one of the first and second frames on which the linear guide concave part engaging with the linear guide convex part is not provided (n is an integer equal to or greater than 2).

In the above, n may be 3.

In the lens barrel, the linear guide concave parts and the linear guide convex parts provided as guides for moving the second frame relative to the first frame along the optical axis are dispersed on the first frame, the second frame, and the fixed barrel. That is, all the linear guide concave parts are not provided on one frame. Therefore, the strength of the first and second frames may be higher than a required value, and thus notch portions may be formed in the circumferential walls of the first and second frames.

In addition, another embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis; and a fixed barrel into which the first frame is inserted, wherein n linear guide concave parts and n linear guide convex parts are provided on the first frame, the second frame, and the fixed barrel, the n linear guide concave parts extending along the optical axis and being located at angular positions dividing a circumference around the optical axis into n approximately equal parts, the n linear guide convex parts engaging with the n linear guide concave parts in a relatively movable manner, wherein one to n−1 of the n linear guide concave parts are provided on the first frame, the other of the n linear guide concave parts is provided on the second frame, and each of the n linear guide convex parts is provided on the fixed barrel or one of the first and second frames on which the linear guide concave part engaging with the linear guide convex part is not provided (n is an integer equal to or greater than 2).

In the above, n may be 3.

In the lens barrel, the linear guide concave parts and the linear guide convex parts provided as guides for moving the second frame relative to the first frame along the optical axis are dispersed on the first frame, the second frame, and the fixed barrel. That is, all the linear guide concave parts are not provided on one frame. Therefore, the strength of the first and second frames may be higher than a required value, and thus notch portions may be formed in the circumferential walls of the first and second frames.

In addition, another embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis, wherein n−1 linear guide concave parts and n−1 linear guide convex parts are provided on the first and second frames, the n−1 linear guide concave parts extending along the optical axis and being located at n−1 of angular positions dividing a circumference around the optical axis into n approximately equal parts, the n−1 linear guide convex parts engaging with the n−1 linear guide concave parts in a relatively movable manner, wherein a shaft provided as a cantilever on the first frame, and a sleeve provided on the second frame and engaging with the shaft are located at the other one of the angular positions at which the linear guide concave parts and the linear guide convex parts are not located (n is an integer equal to or greater than 3).

In the above, n may be 3.

In the lens barrel, the linear guide concave parts and the linear guide convex parts are provided as guides for moving the second frame relative to the first frame, and one of the linear guide concave parts and one of the linear guide convex parts are the sleeve and the shaft. Therefore, all the linear guide concave parts are not provided on one frame. Therefore, the strength of the first and second frames may be higher than a required value, and thus notch portions may be formed in the circumferential walls of the first and second frames. In addition, since the shaft is provided as a cantilever, the lens barrel may have a simple structure.

In addition, another embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis, wherein n−1 linear guide concave parts and n−1 linear guide convex parts are provided on the first and second frames, the n−1 linear guide concave parts extending along the optical axis and being located at n−1 of angular positions dividing a circumference around the optical axis into n approximately equal parts, the n−1 linear guide convex parts engaging with the n−1 linear guide concave parts in a relatively movable manner, wherein a shaft of which both ends are fixed to the first frame, and a sleeve provided on the second frame and engaging with the shaft are located at the other one of the angular positions at which the linear guide concave parts and the linear guide convex parts are not located (n is an integer equal to or greater than 3).

In the above, n may be 3.

In the lens barrel, the linear guide concave parts and the linear guide convex parts are provided as guides for moving the second frame relative to the first frame, and one of the linear guide concave parts and one of the linear guide convex parts are the sleeve and the shaft. Therefore, all the linear guide concave parts are not provided on one frame. Therefore, the strength of the first and second frames may be higher than a required value, and thus notch portions may be formed in the circumferential walls of the first and second frames. In addition, since both ends of the shaft are fixed, the shaft may be securely held.

In addition, another embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis, wherein n−1 linear guide concave parts and n−1 linear guide convex parts are provided on the first and second frames, the n−1 linear guide concave parts extending along the optical axis and being located at n−1 of angular positions dividing a circumference around the optical axis into n approximately equal parts, the n−1 linear guide convex parts engaging with the n−1 linear guide concave parts in a relatively movable manner, wherein a shaft provided as a cantilever on the second frame, and a sleeve provided on the first frame and engaging with the shaft are located at the other one of the angular positions at which the linear guide concave parts and the linear guide convex parts are not located (n is an integer equal to or greater than 3).

In the above, n may be 3.

In the lens barrel, the linear guide concave parts and the linear guide convex parts are provided as guides for moving the second frame relative to the first frame, and one of the linear guide concave parts and one of the linear guide convex parts are the sleeve and the shaft. Therefore, all the linear guide concave parts are not provided on one frame. Therefore, the strength of the first and second frames may be higher than a required value, and thus notch portions may be formed in the circumferential walls of the first and second frames. In addition, since the shaft is provided as a cantilever, the lens barrel may have a simple structure.

In addition, another embodiment of the present disclosure provides a lens barrel retaining lenses while allowing movement along an optical axis, the lens barrel including: a first frame including a circumferential wall surrounding the optical axis; and a second frame including a circumferential wall surrounding the optical axis, the second frame being inserted into the first frame and movable relative to the first frame along the optical axis, wherein n−1 linear guide concave parts and n−1 linear guide convex parts are provided on the first and second frames, the n−1 linear guide concave parts extending along the optical axis and being located at n−1 of angular positions dividing a circumference around the optical axis into n approximately equal parts, the n−1 linear guide convex parts engaging with the n−1 linear guide concave parts in a relatively movable manner, wherein a shaft of which both ends are fixed to the second frame, and a sleeve provided on the first frame and engaging with the shaft are located at the other one of the angular positions at which the linear guide concave parts and the linear guide convex parts are not located (n is an integer equal to or greater than 3).

In the above, n may be 3.

In the lens barrel, the linear guide concave parts and the linear guide convex parts are provided as guides for moving the second frame relative to the first frame, and one of the linear guide concave parts and one of the linear guide convex parts are the sleeve and the shaft. Therefore, all the linear guide concave parts are not provided on one frame. Therefore, the strength of the first and second frames may be higher than a required value, and thus notch portions may be formed in the circumferential walls of the first and second frames. In addition, since both ends of the shaft are fixed, the shaft may be securely held.

Furthermore, in any one of the lens barrels, an inner side notch portion may be formed in the circumferential wall of the second frame.

In this case, particularly, even though an inner component of the second frame is placed in the inner side notch portion away from a center of the second frame, the inner component may not interference with the second frame because the circumferential wall of the second frame is not formed at the inner side notch portion. A second frame of the related art not including an inner side notch portion has to have a relatively large inner diameter because a circumferential wall of the second frame interferes with inner components. However, the lens barrel of the present disclosure includes an inner side notch portion, and thus even though the inner diameter of the lens barrel is decreased, inner components may be arranged in the lens barrel. That is, a space for inner components may be practically increased. Thus, the second frame of the lens barrel may have a smaller diameter that second frames of the related art.

Furthermore, in any one of the lens barrels, an outer side notch portion may be formed in the circumferential wall of the first frame, and preferably, the outer side notch portion may communicate with the inner side notch portion.

In this case, an inner component placed in the inner side notch portion away from the center of the lens barrel may be located close to the outer side notch portion of the first frame. Therefore, in addition to the second frame of the lens barrel, the first frame of the lens barrel may have a small diameter.

Furthermore, both of the first and second frame may be movable along the optical axis, the first frame may be movable along the optical axis, or the second frame may be movable along the optical axis.

Furthermore, in any one of the lens barrels, at least one anti-separation shape may be preferably provided on a linear guide convex part of the first frame.

Furthermore, in any one of the lens barrels, at least one anti-separation shape may be preferably provided on a linear guide convex part of the second frame.

Furthermore, in any one of the lens barrels, at least one anti-separation shape may be preferably provided on a linear guide concave part of the first frame.

Furthermore, in any one of the lens barrel, at least one anti-separation shape may be preferably provided on a linear guide concave part of the second frame.

Owing to the anti-separation shape, for example, even though the lens barrel is dropped and impacted, the first and second frames may not be dislocated and separated from each other.

Furthermore, in any one of the lens barrels, at least one anti-separation shape may be preferably provided on a linear guide convex part of the fixed barrel.

Furthermore, in any one of the lens barrels, at least one anti-separation shape may be preferably provided on a linear guide concave part of the fixed barrel.

Owing to the anti-separation shape, for example, even though the lens barrel is dropped and impacted, the fixed barrel and the first frame may not be dislocated and separated from each other.

An optical device of the present disclosure includes any one of the lens barrels.

Since a notch portion is formed in the circumferential wall of the first frame or the second frame, a space for inner components may be practically increased in the optical device.

According to the lens barrel and the optical device of the present disclosure, the circumferential wall of the first frame or the second frame is configured to form a notch portion, and thus a space for inner components may be practically increased. Therefore, parts such as the second frame may be reduced in size, and thus the lens barrel and the optical device may have small sizes.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a lens barrel and an optical device will be described in detail according to the present disclosure with reference to the accompanying drawings.

The optical device of the present disclosure may be an imaging device including a solid-state imaging element, such as an interchangeable lens system camera, a digital still camera, a video camera, or a surveillance camera. Alternatively, the optical device may be an interchangeable lens of such an imaging device. For example, the lens barrel of the present disclosure may constitute an interchangeable lens of the imaging device.

First Embodiment

Figure 1:
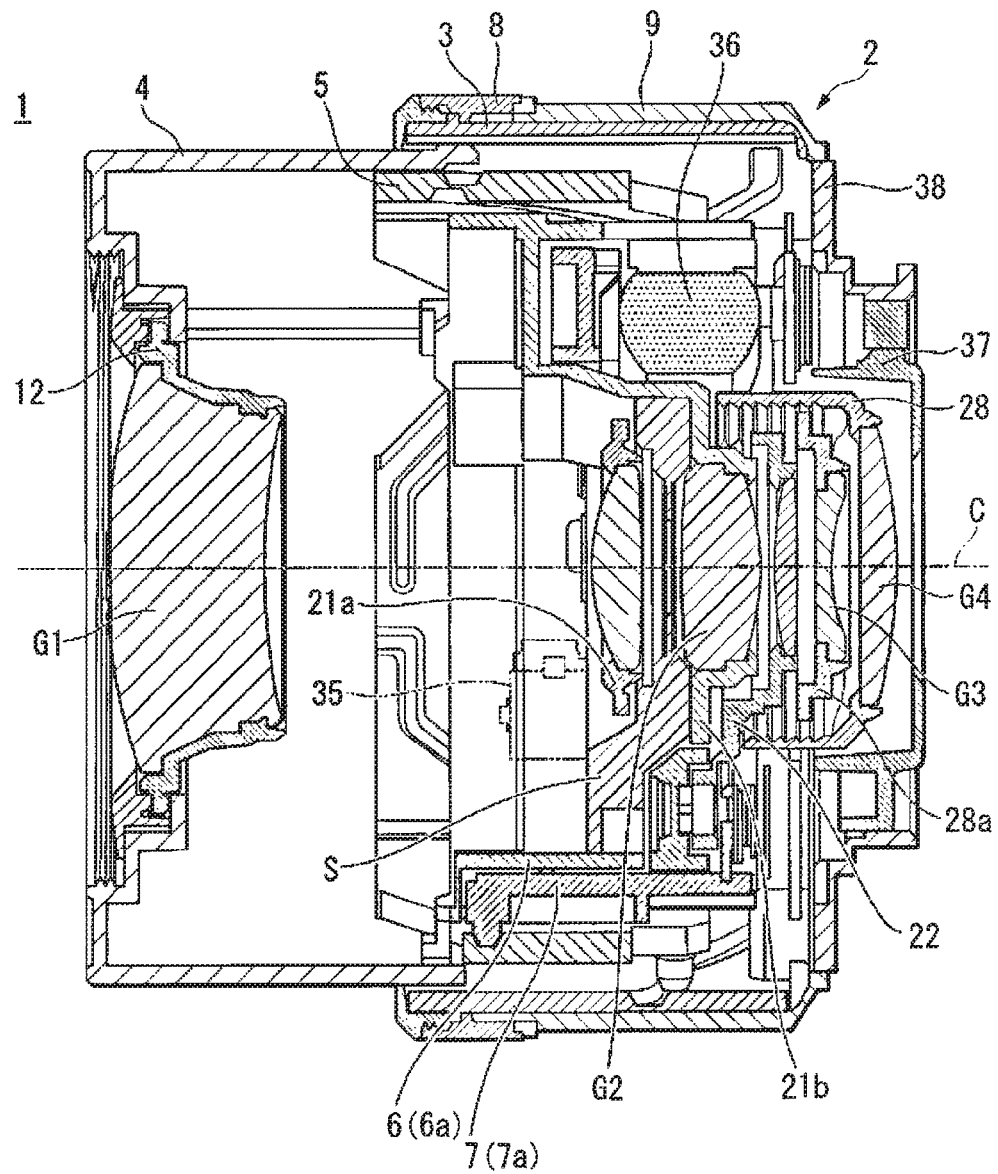
FIG. 1 is a side sectional view illustrating an internal structure of an interchangeable lens (optical device) according to a first embodiment of the present disclosure.

FIG. 1 is a side sectional view illustrating an internal structure of an interchangeable lens (optical device) according to a first embodiment of the present disclosure. In FIG. 1, reference numeral 1 denotes the interchangeable lens, and C denotes an optical axis. The interchangeable lens 1 includes a lens barrel 2 in which a plurality of lens groups G1 to G4 are arranged side by side along the optical axis C, and the lens groups G1 to G4 arranged in the lens barrel 2 constitute an inner focus-type zoom lens.

The zoom lens may include four lens groups: a first lens group G1, a second lens group G2, a third lens group G3, and a fourth group G4 that are sequentially arranged from an object side (a front side of the interchangeable lens 1). In addition, an aperture stop unit S may be placed in the second lens group G2.

In the zoom lens, the first to fourth lens groups G1 to G4 may be individually moved along the optical axis C to adjust the magnification of the zoom lens (zooming), and the third lens group G3 may be moved along the optical axis C to adjust the focus of the zoom lens (focusing). The structure of the zoom lens is not limited thereto. That is, for example, the number or combination of lenses of the zoom lens may be properly changed.

The lens barrel 2 constituting the zoom lens includes: a fixed frame 3 shaped like a cylinder; a first lens group moving frame 4 inserted into the fixed frame 3 and movable in the fixed frame 3 along the optical axis C; a cam frame 5 inserted into the first lens group moving frame 4, the cam frame 5 being movable in the first lens group moving frame 4 along the optical axis C and rotatable about the optical axis C; a second lens group moving frame (first frame) 6 inserted into the cam frame 5 and relatively movable in the cam frame 5 along the optical axis C; and a fourth lens group moving frame (second frame) 7 inserted into the second lens group moving frame 6 and relatively movable in the second lens group moving frame 6 along the optical axis C.

A manipulation ring 8 shaped like a cylinder is installed around a front side (forward part) of the fixed frame 3 in a forward and backward rotatable manner, and an outer frame 9 is fixed behind the manipulation ring 8. If the manipulation ring 8 is rotated by a control mechanism (not shown), a zoom motor unit 36 (described later) is operated. Three linear guide grooves (not shown) extending along the optical axis C may be formed in an inner surface of the fixed frame 3, and three cam grooves (not shown) extending around the optical axis C may be formed in the inner surface of the fixed frame 3. The linear guide grooves are arranged at angular positions approximately trisecting an approximately cylindrical circumferential wall in a circumferential direction around the optical axis C, and the cam grooves are also formed in the same manner. In the present disclosure, for example, the angular trisecting positions may refer to angular positions dividing 360° into angular intervals of 120°±10°.

The first lens group moving frame 4 has an approximately cylindrical shape as a whole. A first lens group retaining part 12 having an approximately cylindrical shape may be formed on an inner front side of the first lens group moving frame 4, and the first lens group G1 may be retained in the first lens group retaining part 12. Three linear guide convex parts (not shown) may be formed on an outer surface of the first lens group moving frame 4 and may be movably engaged with the linear guide grooves of the fixed frame 3, and three linear guide grooves (not shown) and three cam pins (not shown) extending along the optical axis C may be formed on an inner surface of the first lens group moving frame 4. The linear guide convex parts, the linear guide grooves, and the cam pins are respectively arranged at angular positions approximately trisecting approximately cylindrical circumferential walls in a circumferential direction around the optical axis C.

Figure 2A:
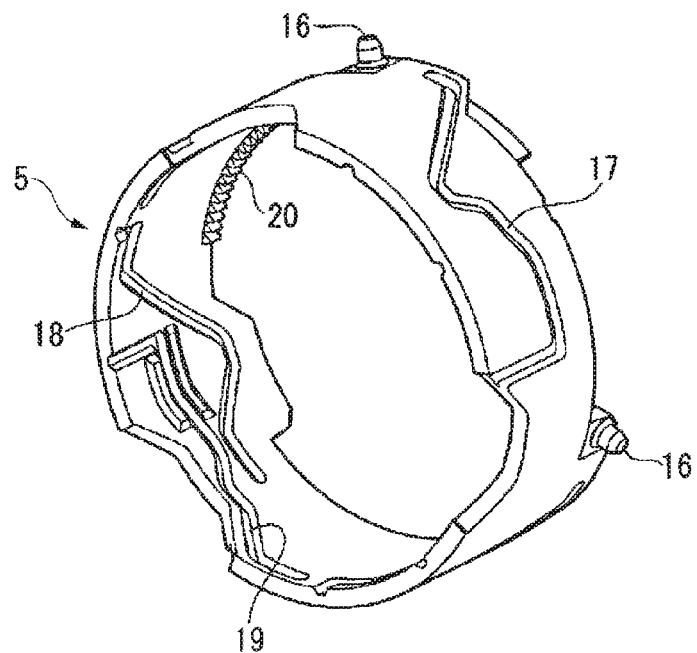
FIGS. 2A and 2B are schematic views illustrating a cam frame, FIG. 2A being a front perspective view, FIG. 2B being a rear perspective view.
Figure 2B:
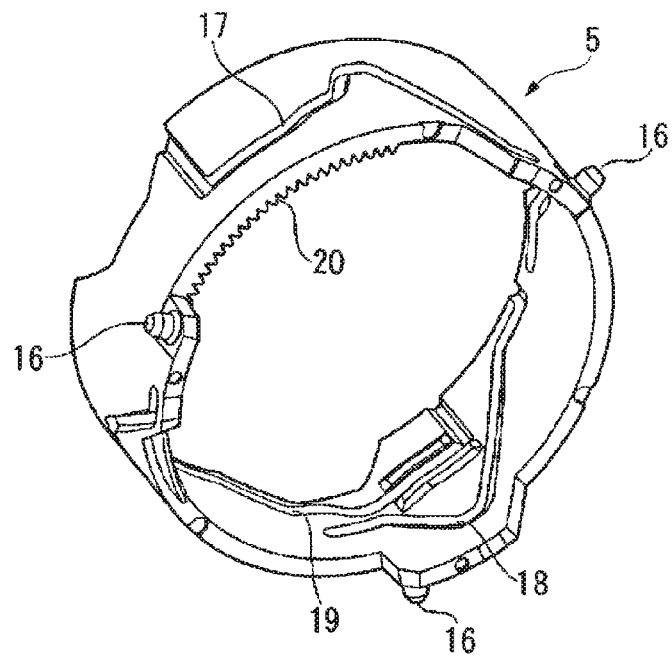

Referring to FIGS. 2A and 2B, the cam frame 5 has a cylindrical shape. The cam frame 5 includes: three cam pins 16 on an outer surface thereof; three first lens group moving frame cam grooves 17 in the outer surface thereof; three second lens group moving frame cam grooves 18 in an inner surface thereof; and three fourth lens group moving frame cam grooves 19 in the inner surface thereof. The cam pins 16 may be engaged with the cam grooves (not shown) of the fixed frame 3 in a relatively movable manner, and the first lens group moving frame cam grooves 17 may be engaged with the cam pins (not shown) of the first lens group moving frame 4 in a relatively movable manner. The cam pins 16, the first lens group moving frame cam grooves 17, the second lens group moving frame cam grooves 18, and the fourth lens group moving frame cam grooves 19 may also be respectively arranged at angular positions approximately trisecting approximately cylindrical circumferential walls in a circumferential direction around the optical axis C. As illustrated in FIG. 2B, a gear 20 is formed on a rear end portion of the cam frame 5.

Figure 3A:
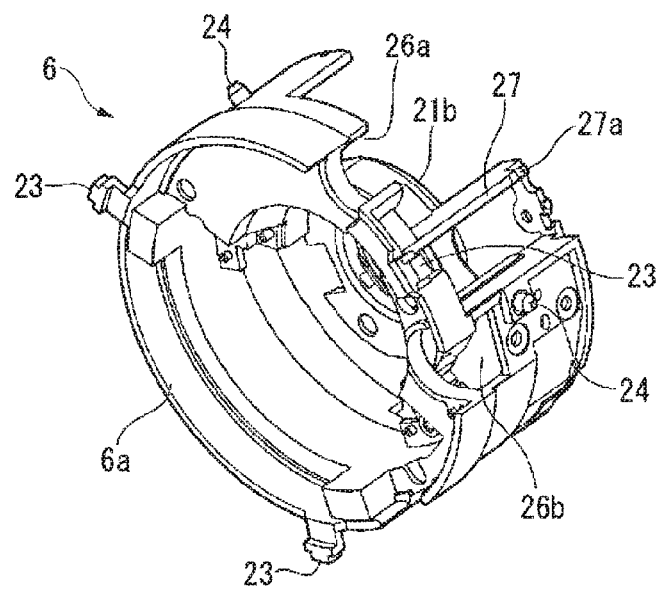
FIGS. 3A and 3B are schematic views illustrating a second lens group moving frame, FIG. 3A being a front perspective view, FIG. 3B being a rear perspective view.
Figure 3B:
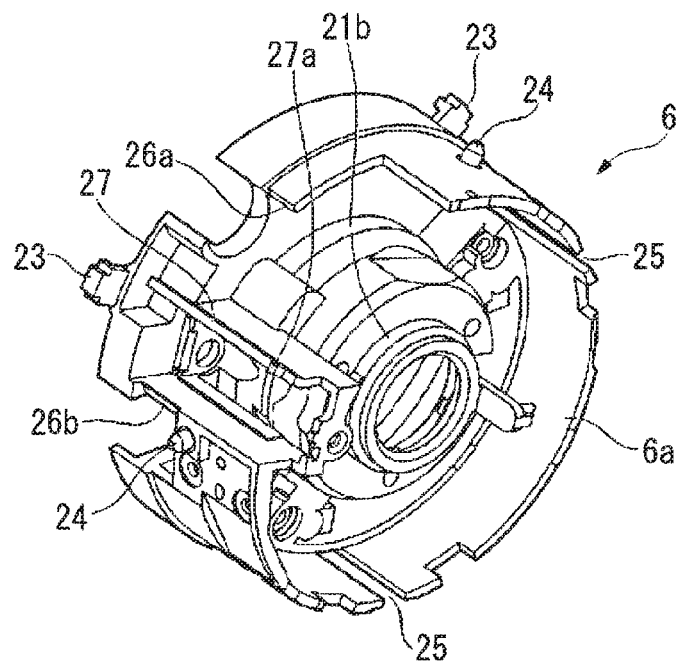

Referring to FIGS. 3A and 3B, the second lens group moving frame 6 includes a circumferential wall 6a having an approximately cylindrical, partially cut-away shape. Second lens group retaining parts 21a and 21b (refer to FIG. 1) having an approximately cylindrical shape are formed inside the circumferential wall 6a. Lenses are respectively retained in the second lens group retaining parts 21a and 21b. In addition, a second lens group retaining frame 22 is installed at a rear side of the lens retained in the second lens group retaining part 21b. The second lens group G2 is retained by the second lens group retaining parts 21a and 21b and the second lens group retaining frame 22. In addition, the aperture stop unit S is placed in the second lens group G2.

Three linear guide protrusions 23 are formed on a front side end portion of an outer surface of the circumferential wall 6a of the second lens group moving frame 6, and three cam pins 24 are formed on the outer surface of the circumferential wall 6a of the second lens group moving frame 6 in a center region along the optical axis C. The three linear guide protrusions 23 are engaged with the linear guide grooves (not shown) of the first lens group moving frame 4 in a relatively movable manner, and the cam pins 24 are engaged with the second lens group moving frame cam grooves 18 of the cam frame 5.

The three linear guide protrusions 23 and the cam pins 24 are respectively arranged at angular positions approximately trisecting the circumferential wall 6a having an approximately cylindrical shape in a circumferential direction around the optical axis C.

As illustrated in FIG. 3B, two linear guide grooves (linear guide concave parts) 25 extending along the optical axis C are formed in the outer surface of the circumferential wall 6a. The linear guide grooves 25 are formed by removing portions of the circumferential wall 6a from a rear side edge to positions adjacent to a front side edge, and thus the linear guide grooves 25 are opened to the outside.

A linear guide rib (linear guide convex part) 27 may be formed in a cut-away region of the circumferential wall 6a, that is, between a first outer side notch portion 26a and a second outer side notch portion 26b. The linear guide rib 27 has a narrow plate shape protruding outward in a radial direction from the second lens group retaining part 21b and extending along the optical axis C, and an anti-separation protrusion 27a may protrude outward in a radial direction from a rear side end portion of the linear guide rib 27. The two linear guide grooves (linear guide concave parts) 25 and the linear guide rib (linear guide convex part) 27 may be respectively arranged at angular positions approximately trisecting the circumferential wall 6a having an approximately cylindrical shape in a circumferential direction around the optical axis C.

Figure 4A:
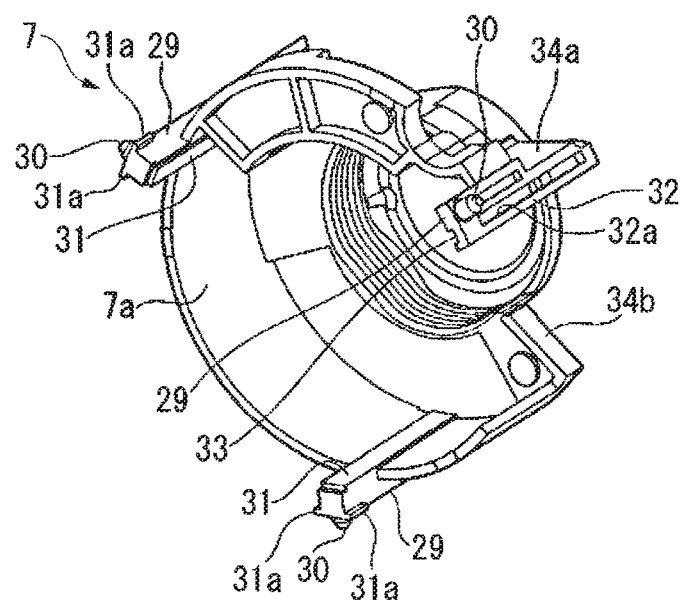
FIGS. 4A and 4B are schematic views illustrating a fourth lens group moving frame, FIG. 4A being a front perspective view, FIG. 4B being a rear perspective view.
Figure 4B:
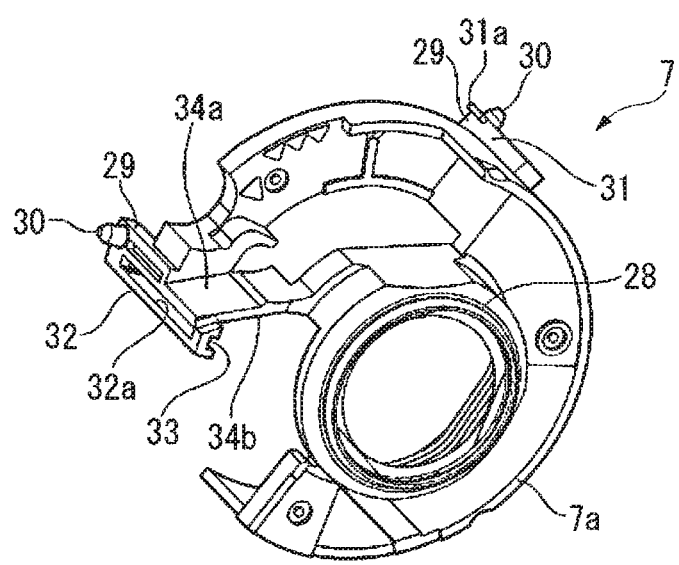

Referring to FIGS. 4A and 4B, the fourth lens group moving frame 7 includes a circumferential wall 7a having an approximately cylindrical, partially cut-away shape, and a lens group retaining part 28 (refer to FIG. 1) having an approximately cylindrical shape is formed on a rear side of the circumferential wall 7a. A third lens group retaining frame 28a is installed inside the lens group retaining part 28, and the third lens group G3 is retained in the third lens group retaining frame 28a. In addition, the fourth lens group G4 is retained on a rear side end portion of the lens group retaining part 28.

Three legs 29 extend from a front side end portion of the circumferential wall 7a of the fourth lens group moving frame 7 along the optical axis C and protrude outward in radial directions. Cam pins 30 are formed on outer surfaces of front side end portions of the legs 29, respectively. The cam pins 30 are engaged with the fourth lens group moving frame cam grooves 19 of the cam frame 5 in a relatively movable manner.

In addition, two of the three legs 29 include linear guide keys (linear guide convex parts) 31. A narrow plate part 32 extending along the optical axis C is formed adjacent to the other of the three legs 29, and a linear guide groove (linear guide concave part) 33 is formed in a length direction of the narrow plate part 32. That is, the linear guide groove 33 extends along the optical axis C. The linear guide groove 33 is formed in an inner side of the narrow plate part 32 and opened at both sides of the narrow plate part 32. A long hole 32a communicating with the linear guide groove 33 is formed in an outer side of the narrow plate part 32. Here, the two linear guide keys (linear guide convex parts) 31 and the linear guide groove (linear guide concave part) 33 are respectively arranged at angular positions approximately trisecting the circumferential wall 7a having an approximately cylindrical shape in a circumferential direction around the optical axis C. In addition, the cam pins 30 are arranged in the same manner.

In addition, cut-away portions, that is, first and second inner side notch portions 34a and 34b are formed in the circumferential wall 7a of the fourth lens group moving frame 7 at both sides of the narrow plate part 32. A region of the first inner side notch portion 34a is formed by cutting a portion of the circumferential wall 7a entirely in a height direction (optical axis direction C) of the circumferential wall 7a, and most of a region of the second inner side notch portion 34b is formed by cutting a portion of the circumferential wall 7a entirely in the height direction (optical axis direction C) of the circumferential wall 7a.

Figure 5:
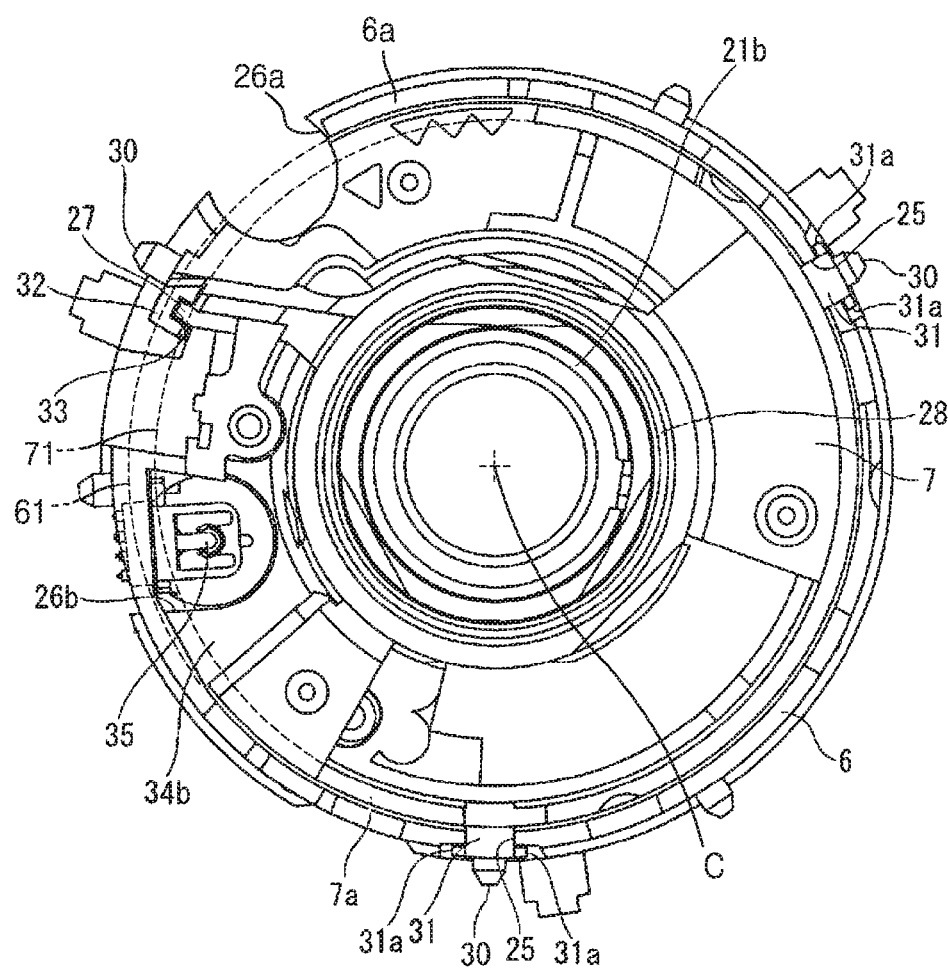
FIG. 5 is a rear view illustrating a state in which the fourth lens group moving frame is inserted into the second lens group moving frame.
Figure 6A:
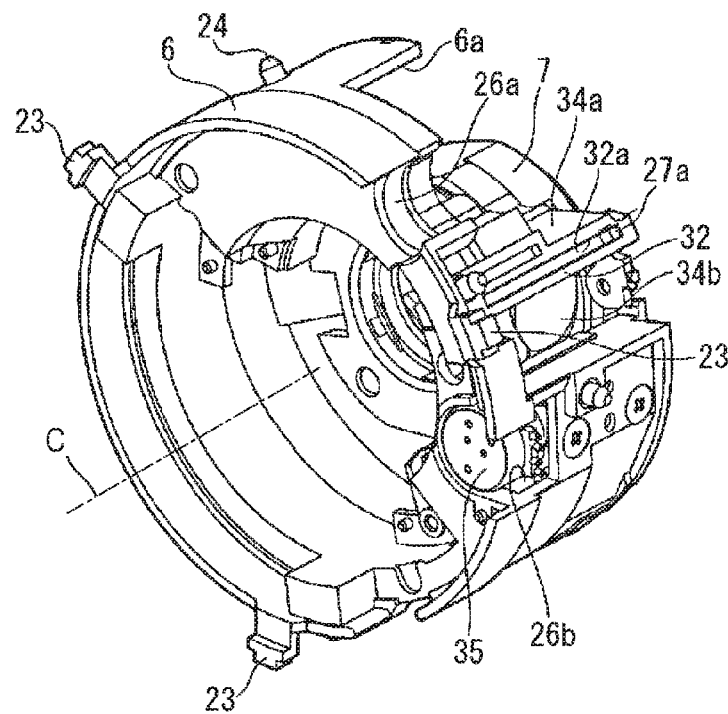
FIGS. 6A and 6B are schematic views illustrating a state in which the fourth lens group moving frame is inserted into the second lens group moving frame, FIG. 6A being a front perspective view, FIG. 6B being a rear perspective view.
Figure 6B:
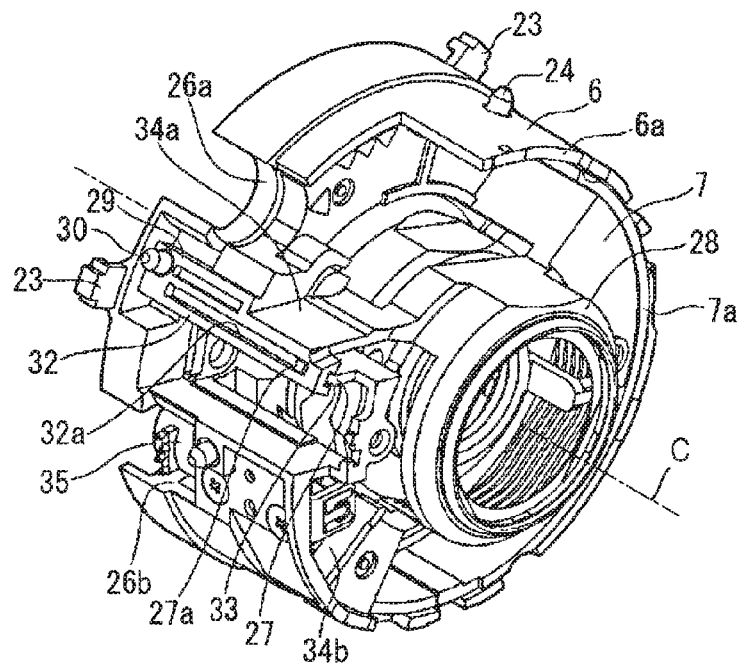

Referring to FIGS. 5, 6A, and 6B, the fourth lens group moving frame 7 is inserted into the second lens group moving frame 6. The first inner side notch portion 34a of the fourth lens group moving frame 7 communicates with the first outer side notch portion 26a of the second lens group moving frame 6, and the second inner side notch portion 34b of the fourth lens group moving frame 7 communicates with the second outer side notch portion 26b of the second lens group moving frame 6.

In the current embodiment, inner components of the interchangeable lens 1 such as a focus motor 35 may be accommodated in a region in which such notch portions communicate with each other, specifically in a region in which the second inner side notch portion 34b and the second outer side notch portion 26b communicate with each other.

Referring to FIGS. 1 and 5, the focus motor 35 is placed at a side of the optical axis C of the lens barrel 2, that is, at a lateral side of the lens groups G1 to G4 arranged in a center region. Referring to FIG. 5, a portion of the focus motor 35 is outside a circular line 71 formed by an inner surface of the circumferential wall 7a of the fourth lens group moving frame 7. In addition, a portion of the focus motor 35 is outside a circular line 61 formed by an inner surface of the circumferential wall 6a of the second lens group moving frame 6. The second inner side notch portion 34b is formed in the circumferential wall 7a of the fourth lens group moving frame 7, and the second outer side notch portion 26b is formed in the circumferential wall 6a of the second lens group moving frame 6. Thus, the focus motor 35 may be placed without interference with the circumferential wall 6a of the second lens group moving frame 6 or the circumferential wall 7a of the fourth lens group moving frame 7.

As illustrated in FIG. 5, the linear guide keys 31 of the fourth lens group moving frame 7 are engaged with the linear guide grooves 25 of the second lens group moving frame 6 in a relatively movable manner, and as illustrated in FIGS. 5, 6A, and 6B, the linear guide groove 33 of the fourth lens group moving frame 7 is engaged with the linear guide rib 27 of the second lens group moving frame 6 in a relatively movable manner. In a state in which the linear guide rib 27 is engaged with the linear guide groove 33 as described above, the anti-separation protrusion 27a of the linear guide rib 27 is engaged with the long hole 32a communicating with the linear guide groove 33 in a relatively movable manner. Owing to this structure, the linear guide rib 27 may not be dislocated from the linear guide groove 33. Therefore, for example, even when the lens barrel 2 is unintentionally dropped and impacted, the fourth lens group moving frame 7 may not be dislocated from the second lens group moving frame 6 along the optical axis C, and thus the second lens group moving frame 6 and the fourth lens group moving frame 7 may not be separated from each other. That is, the anti-separation protrusion 27a functions as an anti-separation shape in the present disclosure.

As illustrated in FIG. 1, the zoom motor unit 36 is installed in the fourth lens group moving frame 7, and a light-blocking ring 37 is installed at a rear side of the lens group retaining part 28 of the fourth lens group moving frame 7. The zoom motor unit 36 is engaged with the gear 20 (refer to FIG. 2B) formed on the inner surface of the cam frame 5. In addition, a lens mount 38 having an approximately cylindrical shape is installed around the light-blocking ring 37.

The lens barrel 2 or the interchangeable lens 1 including the lens barrel 2 may be equipped with various components such as a manual or auto focusing mechanism.

In the above-described structure of the lens barrel 2, if the manipulation ring 8 is rotated, the lens groups G1 to G4 may be advanced or retreated (moved) along the optical axis C. That is, if the manipulation ring 8 is rotated in one direction or the other direction, an electric signal is transmitted to a camera body (not shown), and thus the zoom motor unit 36 is operated according to the amount of rotation of the manipulation ring 8. Then, since the gear 20 formed on the inner surface of the cam frame 5 is engaged with the zoom motor unit 36, the cam frame 5 is rotated.

Since the cam pins 16 arranged on the outer surface of the cam frame 5 are engaged with the cam grooves (not shown) formed in the inner surface of the fixed frame 3, the cam pins 16 are moved relative to the cam grooves as the cam frame 5 is rotated, and thus the cam frame 5 is moved forward (or backward) relative to the fixed frame 3. That is, according to the shape of the cam grooves of the fixed frame 3, the cam frame 5 is moved forward (or backward) while being rotated relative to the fixed frame 3. In other words, the cam frame 5 is spirally operated.

The cam pins (not shown) formed on the inner surface of the first lens group moving frame 4 are engaged with the first lens group moving frame cam grooves 17 of the cam frame 5, and the linear guide convex parts (not shown) formed on the outer surface of the first lens group moving frame 4 are engaged with the linear guide grooves (not shown) of the fixed frame 3. Thus, if the cam frame 5 is spirally operated as described above, the first lens group moving frame 4 is moved forward (or backward). Therefore, the first lens group G1 is moved along the optical axis C.

In addition, the cam pins 24 formed on the outer surface of the second lens group moving frame 6 are engaged with the second lens group moving frame cam grooves 18 of the cam frame 5, and the linear guide protrusions 23 formed on the outer surface of the second lens group moving frame 6 are engaged with the linear guide grooves (not shown) of the first lens group moving frame 4. Thus, when the cam frame 5 is spirally operated as described above, the second lens group moving frame 6 is moved forward (or backward). Therefore, the second lens group G2 is also moved along the optical axis C.

In addition, when the zoom motor unit 36 is operated, the operation amount of the zoom motor unit 36 is detected by a detection mechanism, and the control mechanism calculates a traveled distance based on the operation amount of the zoom motor unit 36. Then, the focus motor 35 is operated by a proper amount according to the traveled distance, and thus the third lens group G3 is moved forward (or backward). That is, the third lens group G3 is also moved along the optical axis C.

In addition, the cam pins 30 formed on the outer surface of the fourth lens group moving frame 7 are engaged with the fourth lens group moving frame cam grooves 19 of the cam frame 5, the linear guide keys 31 are engaged with the linear guide grooves 25 of the second lens group moving frame 6, and the linear guide groove 33 is engaged with the linear guide rib 27 of the second lens group moving frame 6. Thus, when the cam frame 5 is operated, the fourth lens group moving frame 7 is moved forward (or backward). Therefore, the fourth lens group G4 is also moved along the optical axis C.

Therefore, in the interchangeable lens 1 including the lens barrel 2, zooming-in/zooming-out may be performed by rotating the cam frame 5.

In the lens barrel 2 of the current embodiment, linear guide structures are provided to move the fourth lens group moving frame (second frame) 7 relative to the second lens group moving frame (first frame) 6 along the optical axis C. The linear guide structures include the linear guide concave parts (the linear guide grooves 25 and the linear guide groove 33) and the linear guide convex parts (the linear guide rib 27 and the linear guide keys 31). The linear guide structures are dispersed on both the second lens group moving frame 6 and the fourth lens group moving frame 7. That is, since all the linear guide concave parts are not formed on one of the second lens group moving frame 6 and the fourth lens group moving frame 7, the strength of the second lens group moving frame 6 or the fourth lens group moving frame 7 may be higher than a required value. Therefore, the notch portions (the first outer side notch portion 26a, the second outer side notch portion 26b, the first inner side notch portion 34a, and the second inner side notch portion 34b) may be formed in the circumferential wall 6a of the second lens group moving frame 6 or the circumferential wall 7a of the fourth lens group moving frame 7. Since inner components of the lens barrel 2 can be accommodated in the notch portions of the circumferential walls 6a and 7a, an inner component installation space is practically increased. Therefore, the fourth lens group moving frame 7 or the second lens group moving frame 6 may have a smaller diameter than lens group moving frames of the related art, and thus the lens barrel 2 may have a small size. That is, while stably retaining and moving lenses, a space for inner components may be saved, thereby realizing size reduction.

The first inner side notch portion 34a and the second inner side notch portion 34b are formed in the circumferential wall 7a of the fourth lens group moving frame 7. Although inner components such as the focus motor 35 accommodated inside the fourth lens group moving frame 7 are placed in the second inner side notch portion 34b away from a center region including the optical axis C, since the circumferential wall 7a is not formed at the second inner side notch portion 34b, the focus motor 35 may not interfere with the fourth lens group moving frame 7. In the case of a moving frame of the related art not including a notch portion such as the second inner side notch portion 34b, a circumferential wall of the moving frame interferes with the focus motor 35 (inner components), and thus the moving frame has to have a large inner diameter. However, in the lens barrel 2, although the inner diameter of the fourth lens group moving frame 7 is decreased, the focus motor 35 may be placed in the second inner side notch portion 34b. That is, a space for inner components such as the focus motor 35 may be practically increased. Therefore, the fourth lens group moving frame 7 of the lens barrel 2 may have a smaller diameter than moving frames of the related art.

The first outer side notch portion 26a and the second outer side notch portion 26b are formed in the circumferential wall 6a of the second lens group moving frame 6. Since the first outer side notch portion 26a and the second outer side notch portion 26b respectively communicate with the first inner side notch portion 34a and the second inner side notch portion 34b of the fourth lens group moving frame 7, inner components such as the focus motor 35 placed in the first inner side notch portion 34a and the second inner side notch portion 34b away from the center region including the optical axis C may be placed adjacent to the first outer side notch portion 26a and the second outer side notch portion 26b of the second lens group moving frame 6. Therefore, the second lens group moving frame 6 as well as the fourth lens group moving frame 7 of the lens barrel 2 may be reduced in size.

In addition, since a space for inner components such as the focus motor 35 is practically increased owing to the notch portions formed in the circumferential wall 6a of the second lens group moving frame 6 or the circumferential wall 7a of the fourth lens group moving frame 7, the size of the interchangeable lens (optical device) 1 including the lens barrel 2 may also be reduced.

In the embodiment, the anti-separation protrusion 27a is formed on the linear guide rib 27 (the linear guide convex part of the first frame) as an anti-separation shape of the present disclosure. However, in the present disclosure, anti-separation shapes other than the anti-separation protrusion 27a may be used.

For example, as illustrated in FIGS. 4A and 4B, a pair of anti-separation protrusions 31a may be formed on an leading end portion of each of the linear guide keys (linear guide convex parts) 31 of the fourth lens group moving frame (second frame) 7 as anti-separation shapes of the present disclosure. That is, when the linear guide keys 31 are engaged with the linear guide grooves (linear guide concave parts) 25 of the second lens group moving frame (first frame) 6 as illustrated in FIG. 5, the anti-separation protrusions 31a extending from both sides of the leading end portion of each of the linear guide keys 31 are in contact with the outer surface of the circumferential wall 6a forming the linear guide grooves 25.

Therefore, for example, when the lens barrel 2 is unintentionally dropped, even though the linear guide keys 31 are impacted and pushed toward the inside of the circumferential wall 6a of the second lens group moving frame 6, the linear guide keys 31 are not separated owing to the anti-separation protrusions 31a. Therefore, the cam pins 30 may be not dislocated by separation of the linear guide keys 31, and thus the fourth lens group moving frame 7 may not be dislocated from the second lens group moving frame 6 along the optical axis C. That is, the second lens group moving frame 6 and the fourth lens group moving frame 7 may not be separated from each other. That is, the anti-separation protrusions 31a also function as anti-separation shapes of the present disclosure.

Figure 7A:
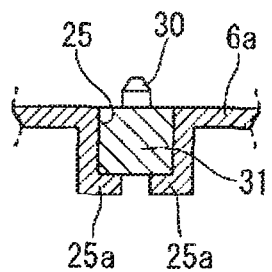
FIGS. 7A and 7B are enlarged views illustrating modification examples of an anti-separation shape according to the present disclosure.

In addition, as illustrated in FIG. 7A, anti-separation parts 25a may be provided on inner sides of each of the linear guide grooves 25. The circumferential wall 6a in which the linear guide grooves 25 are formed, that is, portions of the circumferential wall 6a between which the linear guide grooves 25 are formed are bent toward the inside of the second lens group moving frame 6 and toward the linear guide grooves 25 so as to form the anti-separation parts 25a having an L-like sectional shape. Since the anti-separation parts 25a are provided at the linear guide grooves 25, the linear guide keys 31 engaged with the linear guide grooves 25 may not be separated in a direction toward the inside of the circumferential wall 6a. Therefore, the fourth lens group moving frame 7 may not be dislocated from the second lens group moving frame 6 along the optical axis C, and thus the second lens group moving frame 6 and the fourth lens group moving frame 7 may not be separated from each other. That is, the anti-separation parts 25a function as anti-separation shapes of the present disclosure. In addition, the pair of anti-separation parts 25a may be formed in one piece and provided as one anti-separation part.

Figure 7B:
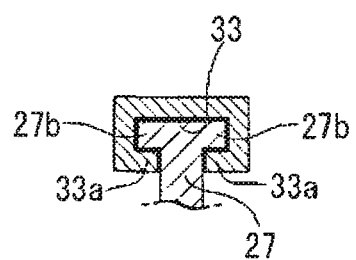

In addition, as illustrated in FIG. 7B, anti-separation parts 33a having the same shape as the anti-separation parts 25a may be provided on inner sides of the linear guide groove 33 of the fourth lens group moving frame (second frame) 7. In this case, an engagement protrusion 27b is provided on an upper end portion of the linear guide rib 27 engaging with the linear guide groove 33, and the anti-separation parts 33a is engaged with the engagement protrusion 27b. Since the anti-separation parts 33a are provided at the linear guide groove 33, the linear guide rib 27 engaged with the linear guide groove 33 may not be separated toward the inside of the fourth lens group moving frame (second frame) 7. Therefore, the fourth lens group moving frame 7 may not be dislocated from the second lens group moving frame 6 along the optical axis C, and thus the second lens group moving frame 6 and the fourth lens group moving frame 7 may not be separated from each other. That is, the anti-separation parts 33a function as anti-separation shapes of the present disclosure.

Second Embodiment

Figure 8:
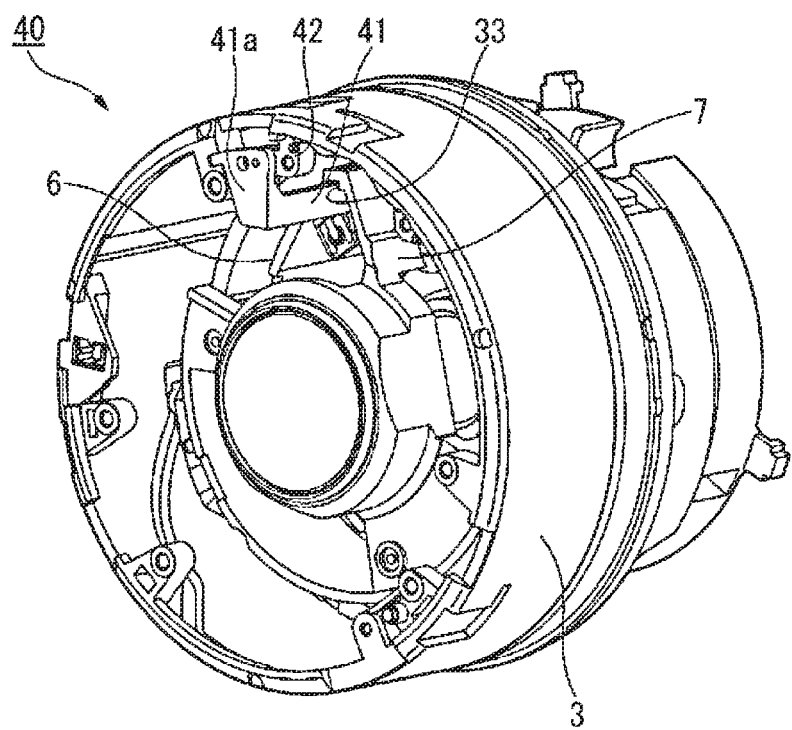
FIG. 8 is a perspective view illustrating main parts of a lens barrel according to a second embodiment of the present disclosure.

FIG. 8 is a perspective view illustrating main parts of a lens barrel according to a second embodiment of the present disclosure. In FIG. 8, reference numeral 40 refers to the lens barrel. The lens barrel 40 is different from the lens barrel 2 described with reference to FIGS. 1 to 6 in that one of three linear guide convex parts proposed in the present disclosure is provided on a fixed frame (fixed barrel) 3.

That is, as illustrated in FIG. 8, a linear guide key 41 is installed as a linear guide convex part on an end of the fixed frame 3 (a side facing the lens mount 38 in FIG. 1) in an optical axis direction C. The linear guide key 41 is installed at a position corresponding to the linear guide rib 27 of the second lens group moving frame (first frame) 6 illustrated in FIGS. 3A and 3B. That is, the linear guide key 41 is installed on the fixed frame 3 instead of the linear guide rib 27.

Figure 9:
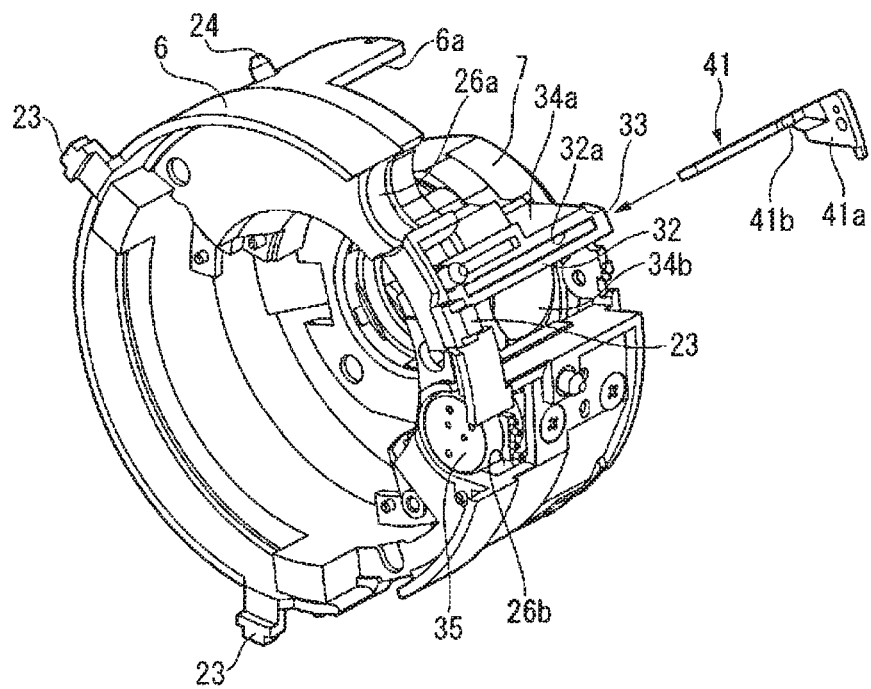
FIG. 9 is a perspective view illustrating main parts of the lens barrel according to the second embodiment of the present disclosure.

As illustrated in FIG. 9, the linear guide key 41 has a thin, long, narrow plate shape, and a mount part 41a having a screw hole is formed in one piece with an end of the linear guide key 41. As illustrated in FIG. 8, the linear guide key 41 is fixed to the fixed frame 3 by screw coupling the mount part 41a to a mount member 42 formed on the end of the fixed frame 3.

In this structure, as illustrated in FIG. 9, the linear guide key 41 is movable engaged with a linear guide groove 33. In addition, an anti-separation protrusion 41b is formed on the linear guide key 41, and the anti-separation protrusion 41b movably engages with a long hole 32a of a narrow plate part 32 of a fourth lens group moving frame 7. The anti-separation protrusion 41b has the same function as the anti-separation protrusion 27a of the linear guide rib 27 of the first embodiment. That is, for example, even when the lens barrel 40 is unintentionally dropped and impacted, a second lens group moving frame 6 may not be dislocated from the fixed frame 3 along the optical axis C, and thus the fixed frame 3 and the second lens group moving frame 6 may not be separated from each other. That is, the anti-separation protrusion 41a functions an anti-separation shape of the present disclosure.

In the lens barrel 40 of the current embodiment having the above-described structure, guides for moving the fourth lens group moving frame (second frame) 7 relative to the second lens group moving frame (first frame) 6 along the optical axis C are constituted by linear guide concave parts (linear guide grooves 25 and the linear guide groove 33) and linear guide convex parts (the linear guide key 41 and linear guide keys 31), and the guides are dispersed on the second lens group moving frame 6, the fourth lens group moving frame 7, and the fixed frame 3. That is, since all the linear guide concave parts are not formed on one frame, the strength of the second lens group moving frame 6 or the fourth lens group moving frame 7 may be higher than a required value. Therefore, notch portions (a first outer side notch portion 26a, a second outer side notch portion 26b, a first inner side notch portion 34a, and a second inner side notch portion 34b) may be formed in circumferential walls 6a and 7a, and owing to the notch portions formed in the circumferential walls 6a and 7a, a space for inner components of the lens barrel 40 may be practically increased. Therefore, the fourth lens group moving frame 7 or the second lens group moving frame 6 may have a smaller diameter than lens group moving frames of the related art, and thus the lens barrel 40 may have a small size. That is, while stably retaining and moving the inner components, a space for inner components may be saved, thereby realizing size reduction.

In addition, according to the second embodiment, one of three linear guide convex parts of the present disclosure is provided on the fixed frame 3. However, one of three linear guide concave parts may be provided on the fixed frame 3. In detail, the narrow plate part 32 having the linear guide groove 33 illustrated in FIGS. 4A and 4B may not be provided on the fourth lens group moving frame 7. Instead, an independent member corresponding to the narrow plate part 32 may be provided on the fixed frame 3. That is, like the linear guide key 41 illustrated in FIG. 8, the independent member may be mounted on the fixed frame 3 at a position corresponding to the narrow plate part 32 and may be movably engaged with the linear guide rib 27 of the second lens group moving frame 6.

Figure 10:
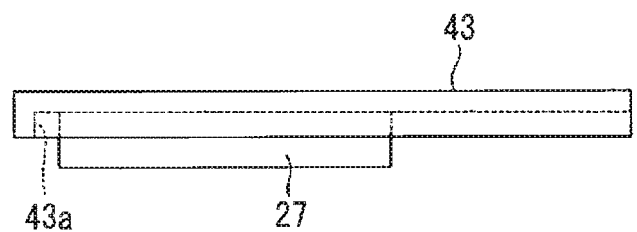
FIG. 10 is a side view illustrating a modification example of the anti-separation shape according to the present disclosure.

In addition, as illustrated in FIG. 10, a linear guide groove member 43 may be provided as an independent member having a linear guide groove 33, and a cover 43a may be formed on a leading end of the linear guide groove member 43 to close an opened side of the linear guide groove 33. The cover 43a may be brought into contact with or separated from a leading end portion of the linear guide rib 27. The linear guide rib 27 is a plate protruding outward in a radial direction of the second lens group moving frame 6, and the leading end portion of the linear guide rib 27 may be brought into contact or separated from the cover 43a.

In this case, for example, even when the lens barrel 40 is unintentionally dropped and impacted, the second lens group moving frame 6 may not be dislocated from the fixed frame 3 along the optical axis C, and thus the fixed frame 3 and the second lens group moving frame 6 may not be separated from each other. That is, the cover 43a functions as an anti-separation shape of the present disclosure.

In the lens barrel 40 in which the linear guide groove member 43 is provided on the fixed frame 3, the fourth lens group moving frame 7 or the second lens group moving frame 6 may have a smaller diameter than lens group moving frames of the related art, and thus the lens barrel 40 may have a small size. That is, while stably retaining and moving lenses, a space for inner components may be saved, thereby realizing size reduction.

Third Embodiment

Figure 11:
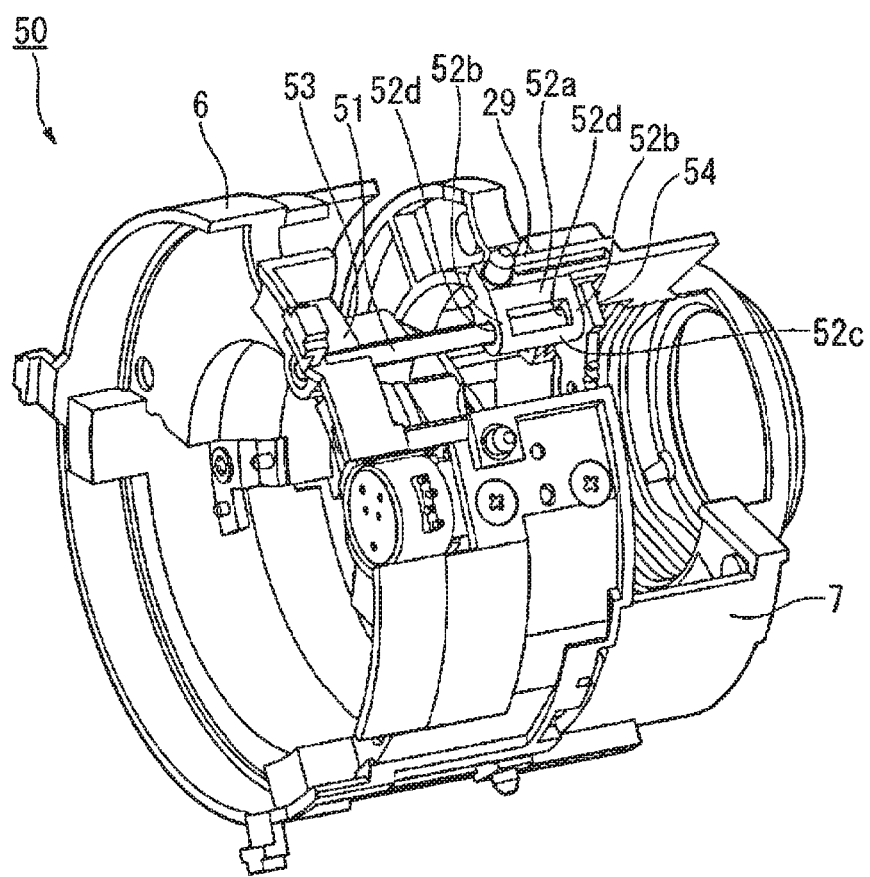
FIG. 11 is a perspective view illustrating main parts of a lens barrel according to a third embodiment of the present disclosure.

FIG. 11 is a perspective view illustrating main parts of a lens barrel according to a third embodiment of the present disclosure. In FIG. 11, reference numeral 50 refers to the lens barrel. The lens barrel 50 is different from the lens barrel 2 described with reference to FIGS. 1 to 6, in that two of three linear guide convex parts and two of three linear guide concave parts of the present disclosure are provided on a second lens group moving frame (first frame) 6 or a fourth lens group moving frame (second frame) 7, and the other linear guide convex part is provided as a shaft 51 and the other linear guide concave part is provided as a sleeve 52.

As illustrated in FIG. 11, the shaft 51 is installed on the second lens group moving frame 6 instead of the linear guide rib 27 at a position corresponding to the position of the linear guide rib 27 illustrated in FIGS. 3A and 3B. The shaft 51 is formed of a metal or a hard resin and has a thin, long, cylindrical shape. In the current embodiment, an end portion of the shaft 51 is fixedly retained by a first retaining part 53, and the other end portion is fixedly retained by a second retaining part 54. That is, both end portions of the shaft 51 are fixed to the second lens group moving frame (first frame) 6.

In the current embodiment, the sleeve 52 is provided instead of the narrow plate part 32 including the linear guide groove 33 illustrated in FIGS. 4A and 4B. As illustrated in FIG. 11, the sleeve 52 is formed in one piece with a leg 29. The sleeve 52 includes: a base part 52a formed in one piece with the leg 29; a pair of retaining plate parts 52b formed in one piece with the base part 52a; and a connection part 52c connecting the retaining plate parts 52b. The shaft 51 is inserted through penetration holes 52d formed in the retaining plate parts 52b. That is, in a state in which the second lens group moving frame 6 and the fourth lens group moving frame 7 are attached to each other, the shaft 51 is inserted through the penetration holes 52d of the sleeve 52 and fixedly retained by the first retaining part 53 and the second retaining part 54. In this manner, the shaft 51 and the sleeve 52 are engaged with each other.

In the lens barrel 50 including the shaft 51 and the sleeve 52, the fourth lens group moving frame 7 or the second lens group moving frame 6 may have a smaller diameter than lens group moving frames of the related art, and thus the lens barrel 50 may have a small size like the lens barrel 2. That is, while stably retaining and moving lenses, a space for inner components may be saved, thereby realizing size reduction.

In addition, since both end portions of the shaft 51 are fixed to the second lens group moving frame 6, the shaft 51 may effectively maintain the shape of the second lens group moving frame 6.

Furthermore, in the third embodiment illustrated in FIG. 11, the shaft 51 is retained (positioned) by fixing both end portions of the shaft 51 to the second lens group moving frame (first frame) 6 using the first retaining part 53 and the second retaining part 54. However, only one end portion of the shaft 51 may be fixedly retained. That is, like a cantilever, the shaft 51 may be fixedly retained by only the first retaining part 53, and the second retaining part 54 may not be provided.

In this case, the second lens group moving frame 6 may have a simple structure compared to the case in which both end portions of the shaft 51 are fixedly retained.

Furthermore, in the third embodiment, the shaft 51 is provided instead of the linear guide rib 27 at a position corresponding to the position of the linear guide rib 27 illustrated in FIGS. 3A and 3B, and the sleeve 52 is provided instead of the narrow plate part 32 at a position corresponding to the position of the narrow plate part 32 illustrated in FIGS. 4A and 4B. However, this positional relationship may be reversed. That is, the sleeve 52 may be provided at a position corresponding to the position of the linear guide rib 27, and the shaft 51 may be provided at a position corresponding to the position of the narrow plate part 32. In other words, the sleeve 52 may be provided on the second lens group moving frame (first frame) 6, and the shaft 51 may be provided on the fourth lens group moving frame (second frame) 7.

In detail, the sleeve 52 illustrated in FIG. 11 may be used as a retaining part for fixedly retaining the shaft 51, and the shaft 51 may be fixed to the retaining part. In this manner, the shaft 51 may be positioned at the fourth lens group moving frame (second frame) 7 using the retaining part. In this case, the pair of retaining plate parts 52b may be used to retain and fix the shaft 51, and thus both end portions of the shaft 51 may be fixedly retained (positioned). Alternatively, the shaft 51 may be fixedly retained by only an outer one of the retaining plate parts 52b (the right retaining plate part 52b in FIG. 11). That is, the shaft 51 may be retained (positioned) like a cantilever.

In the case in which the sleeve 52 is provided on the second lens group moving frame (first frame) 6, for example, the first retaining part 53 illustrated in FIG. 11 may have a cylindrical shape so that the shaft 51 may be insertable into the first retaining part 53 and removable from the first retaining part 53. In this manner, the first retaining part 53 may be used as a sleeve.

Although the positions of the shaft 51 and the sleeve 52 are switched as described above, the fourth lens group moving frame 7 or the second lens group moving frame 6 may have a smaller diameter than lens group moving frames of the related art, and thus the lens barrel 50 may have a small size like in the third embodiment. That is, while stably retaining and moving lenses, a space for internal components may be saved, thereby realizing size reduction.

In addition, if both end portions of the shaft 51 are fixed to the fourth lens group moving frame 7, the shaft 51 may effectively maintain the shape of the fourth lens group moving frame 7.

If the shaft 51 is provided as a cantilever on the fourth lens group moving frame 7, the fourth lens group moving frame 7 may have a simple structure compared to the case in which both end portions of the shaft 51 are fixed.

While preferred embodiments of the present disclosure have been described with reference to the accompanying drawings, the present disclosure is not limited to the embodiments. Features such as shapes or combinations of constituent members described in the embodiments are examples, and these features may be variously modified according to conditions such as design requirements within the scope of the present disclosure.

For example, in the first embodiment, two linear guide concave parts (the linear guide grooves 25) and a linear guide convex part (the linear guide rib 27) are formed on the first frame (the second lens group moving frame 6), and a linear guide concave part (the linear guide groove 33) and two linear guide convex parts (the linear guide keys 31) are formed on the second frame (the fourth lens group moving frame 7). However, a linear guide concave part and two linear guide convex part may be formed on the first frame (the second lens group moving frame 6), and two linear guide concave parts and a linear guide convex part may be formed on the second frame.

Furthermore, in the first embodiment, three linear guide concave parts (the linear guide grooves 25 and the linear guide groove 33) and three linear guide convex parts (the linear guide rib 27 and the linear guide keys 31) are formed on the first frame (the second lens group moving frame 6) and the second frame (the fourth lens group moving frame 7) at angular positions approximately trisecting a circumference around the optical axis C. However, each of the number of the linear guide concave parts and the number of the linear guide convex parts may be two, four, or more. That is, each of the number of the linear guide concave parts and the number of the linear guide convex parts may be n (where n denotes an integer equal to or greater than 2). In this case, the linear guide concave parts are arranged at angular positions dividing a circumference around the optical axis C into n approximately equal parts, and the linear guide convex parts are arranged in the same manner.

Furthermore, in the first embodiment, both the first frame (the second lens group moving frame 6) and the second frame (the fourth lens group moving frame 7) are movable in the fixed frame 3. However, the present disclosure is not limited thereto. For example, one of the first and second frames may be movable, and the other of the first and second frames may be fixed.

Furthermore, in the first embodiment, the fixed frame 3 is positioned outside the cam frame 5. However, for example, the fixed frame 3 may be positioned between the second lens group moving frame 6 and the cam frame 5.

While the present disclosure has been shown and described with reference to various embodiments thereof, it will be understood by those skilled in the art that various changes in form and details may be made therein without departing from the spirit and scope of the present disclosure as defined by the appended claims and their equivalents.

REFERENCE NUMERALS

1 . . . interchangeable lens (optical device), 2 . . . lens barrel, 3 . . . fixed frame (fixed barrel), 5 . . . cam frame, 6 . . . second lens group moving frame (first frame), 6a . . . circumferential wall, 7 . . . fourth lens group moving frame (second frame), 7a . . . circumferential wall, 25 . . . linear guide grooves (linear guide concave parts), 26a . . . first outer side notch portion, 26b . . . second outer side notch portion, 27 . . . linear guide rib (linear guide convex part), 31 . . . linear guide keys (linear guide convex parts), 33 . . . linear guide groove (linear guide concave part), 34a . . . first inner side notch portion, 34b . . . second inner side notch portion, 35 . . . focus motor, C . . . optical axis, G1 . . . first lens group, G2 . . . second lens group, G3 . . . third lens group, G4 . . . fourth lens group, 40 . . . lens barrel, 41 . . . linear guide key, 43 . . . linear guide groove member, 50 . . . lens barrel, 51 . . . shaft, 52 . . . sleeve

The invention claimed is:

1. A lens barrel retaining lenses while allowing movement along an optical axis, the lens barrel comprising:
   a first frame;
   a second frame positioned inside the first frame; and
   n linear guide structures configured to allow movement of the second frame relative to the first frame along the optical axis,
   wherein the n linear guide structures comprise:
   n linear guide concave parts spaced apart from each other in a circumferential direction around the optical axis and extending along the optical axis; and
   n linear guide convex parts engaging with the n linear guide concave parts in a relatively movable manner,
   wherein all of n linear guide concave parts are not provided on one of the first frame and the second frame, and
   n is an integer equal to or greater than 2.

2. The lens barrel of claim 1, wherein some of the n linear guide concave parts are provided on the first frame, and the others of the n linear guide concave parts are provided on the second frame.

3. The lens barrel of claim 1, further comprising a fixed frame positioned outside the first frame, wherein the n linear guide concave parts are provided on at least two of the first frame, the second frame, and the fixed frame.

4. The lens barrel of claim 1,
   wherein n−1 linear guide structures of the n linear guide structures comprise: n−1 linear guide concave parts spaced apart from each other in a circumferential direction around the optical axis and extending along the optical axis; and n−1 linear guide convex parts engaging with the n−1 linear guide concave parts in a relatively movable manner, and
   the other one of the n linear guide structures comprises: a shaft spaced apart from the n−1 linear guide concave parts and the n−1 linear guide convex parts in the circumferential direction around the optical axis; and a sleeve engaging with the shaft,
   wherein the shaft is positioned at one of the first and second frames, and the sleeve is positioned at the other of the first and second frames,
   and n is an integer equal to or greater than 3.

5. The lens barrel of claim 1, wherein the second frame comprises a circumferential wall surrounding the optical axis, and at least one inner side notch portion is formed in the circumferential wall.

6. The lens barrel of claim 5, further comprising an inner component at least partially inserted into the inner side notch portion and positioned away from a center region including the optical axis.

7. The lens barrel of claim 6, wherein a portion of the inner component is positioned outside a circular line formed by an inner surface of the circumferential wall of the second frame.

8. The lens barrel of claim 5, wherein the first frame comprises a circumferential wall, and
   at least one outer side notch portion is formed in the circumferential wall of the first frame and communicates with the inner side notch portion.

9. The lens barrel of claim 8, further comprising an inner component at least partially inserted into the inner side notch portion and the outer side notch portion and positioned away from a center region including the optical axis.

10. The lens barrel of claim 9, wherein a portion of the inner component is positioned outside a circular line formed by an inner surface of the circumferential wall of the first frame.

11. The lens barrel of claim 1, wherein at least one anti-separation shape is provided on the linear guide convex parts.

12. The lens barrel of claim 1, wherein at least one anti-separation shape is provided on the linear guide concave parts.

13. The lens barrel of claim 4, wherein one end portion or both end portions of the shaft are fixed to one of the first and second frames.

14. The lens barrel of claim 1, wherein the n linear guide structures are respectively located at positions dividing a circumference around the optical axis into n parts.

15. The lens barrel of claim 1, wherein at least one of the first and second frames is movable along the optical axis.

16. The lens barrel of claim 1, wherein n is three.

17. The lens barrel of claim 16, wherein two of the three linear guide concave parts are provided on the first frame, and
    the other one of the three linear guide concave parts is provided on the second frame.

18. An optical device comprising the lens barrel of claim 1.

* * * * *